United States Patent
Wass et al.

(10) Patent No.: US 10,390,365 B2
(45) Date of Patent: Aug. 20, 2019

(54) EXPANDED PROTOCOL FRAMES FOR DATA TRANSMISSION

(71) Applicant: SCA Hygiene Products AB, Göteborg (SE)

(72) Inventors: Andreas Wass, Borlänge (SE); Erik Lärfars, Borlänge (SE)

(73) Assignee: ESSITY HYGIENE AND HEALTH AKTIEBOLAG, Göteborg (SE)

(*) Notice: Subject to any disclaimer, the term of this patent is extended or adjusted under 35 U.S.C. 154(b) by 150 days.

(21) Appl. No.: 15/102,289

(22) PCT Filed: Dec. 11, 2013

(86) PCT No.: PCT/EP2013/076203
§ 371 (c)(1),
(2) Date: Jun. 7, 2016

(87) PCT Pub. No.: WO2015/086057
PCT Pub. Date: Jun. 18, 2015

(65) Prior Publication Data
US 2016/0338101 A1    Nov. 17, 2016

(51) Int. Cl.
*H04W 4/00* (2018.01)
*H04W 74/06* (2009.01)
(Continued)

(52) U.S. Cl.
CPC .......... *H04W 74/06* (2013.01); *H04B 7/2643* (2013.01); *H04W 84/12* (2013.01);
(Continued)

(58) Field of Classification Search
None
See application file for complete search history.

(56) References Cited

U.S. PATENT DOCUMENTS 8,971,229 B1 * 3/2015 Yenganti ........... H04W 52/0216
370/311
9,191,881 B2 * 11/2015 Benjannins ........... H04W 48/12
(Continued)

FOREIGN PATENT DOCUMENTS

CN    101114858 A    1/2008
CN    101835272 A    9/2010
(Continued)

OTHER PUBLICATIONS

Australian examination report No. 1 dated Feb. 24, 2017 issued in counterpart Australian patent application No. 2013407434 (3 pages).
(Continued)

*Primary Examiner* — Bob A Phunkulh
(74) *Attorney, Agent, or Firm* — Drinker Biddle & Reath LLP (57) ABSTRACT

Transmitting a data frame from a source device to a target device, wherein the source device and the target device use a protocol defining a request command frame for polling for pending data, involving obtaining data to be transmitted to the target device in the source device, generating a request command frame for polling data pending for the source device at the target device, allocating the data to be transmitted in the request command frame, and transmitting the request command frame with the allocated data to be transmitted to the target device.

19 Claims, 3 Drawing Sheets

(51) Int. Cl.
*H04B 7/26* (2006.01)
*H04W 84/12* (2009.01)

(52) U.S. Cl.
CPC .............. *Y02D 70/00* (2018.01); *Y02D 70/10* (2018.01); *Y02D 70/1222* (2018.01); *Y02D 70/1242* (2018.01); *Y02D 70/14* (2018.01); *Y02D 70/142* (2018.01); *Y02D 70/144* (2018.01); *Y02D 70/146* (2018.01); *Y02D 70/162* (2018.01); *Y02D 70/449* (2018.01)

(56) References Cited

U.S. PATENT DOCUMENTS

| | | | | |
|---|---|---|---|---|
| 2006/0221993 | A1* | 10/2006 | Liao | H04W 74/06 |
| | | | | 370/449 |
| 2010/0067423 | A1* | 3/2010 | Sun | H04W 72/1215 |
| | | | | 370/311 |
| 2010/0067424 | A1* | 3/2010 | Sun | H04W 72/1215 |
| | | | | 370/311 |
| 2010/0246600 | A1 | 9/2010 | Das et al. | |
| 2013/0128798 | A1* | 5/2013 | Liu | H04W 48/12 |
| | | | | 370/312 |
| 2014/0269628 | A1* | 9/2014 | Ghosh | H04W 74/04 |
| | | | | 370/336 |
| 2014/0334387 | A1* | 11/2014 | Doppler | H04W 74/0816 |
| | | | | 370/329 |
| 2014/0335871 | A1* | 11/2014 | Doppler | H04W 16/02 |
| | | | | 455/448 |
| 2015/0085777 | A1* | 3/2015 | Seok | H04W 52/0216 |
| | | | | 370/329 |
| 2015/0124722 | A1* | 5/2015 | Seok | H04W 74/04 |
| | | | | 370/329 |

FOREIGN PATENT DOCUMENTS

| | | |
|---|---|---|
| RU | 2011114030 A | 10/2012 |
| WO | WO-2010/143756 A2 | 12/2010 |
| WO | WO-2013/155411 A1 | 10/2013 |

OTHER PUBLICATIONS

Russian Decision on Grant dated Oct. 2, 2017 issued in corresponding Russian patent application No. 2016127567 (13 pages) and its English-language translation thereof (9 pages).
Notification of the First Office Action dated Aug. 29, 2018 in Chinese Patent Application No. 201380081504 (8 pages) with an English translation (13 pages).
Communication pursuant to Article 94(3) EPC issued Jun. 13, 2018 in European Patent Application No. 13 805 847.4.
Communication pursuant to Article 94(3) EPC dated May 17, 2019 in European Patent Application No. 13 805 847.4.
Decision of Rejection dated May 22, 2019 in Chinese Patent Application No. 201380081504.4 (5 pages) together with an English Translation (13 pages).

* cited by examiner

Fig. 2

EXPANDED PROTOCOL FRAMES FOR DATA TRANSMISSION

CROSS-REFERENCE TO PRIOR APPLICATION

This application is a § 371 National Stage Application of PCT International Application No. PCT/EP2013/076203 filed Dec. 11, 2013, which is incorporated herein in its entirety.

TECHNICAL FIELD

The present disclosure relates to the field of data transmission between a source device and a target device, wherein the devices employ a protocol that defines a request command frame. Specifically, the present disclosure relates to a method of transmitting a data frame and to corresponding devices configured to transmit data frames. More specifically, the present disclosure relates to the field of distributed data acquisition as part of facility management.

BACKGROUND

There are plenty of established protocols for data exchange and communication. Some protocols are adapted to specific characteristics of the employed communication channel, in that the protocol definition takes into account— amongst others—data rate of the channel, whether the channel is shared or not, channel length, physical implementation (e.g. wire bound or wire-less transmission), radio frequency bandwidth, etc. Protocols and definitions for local wire-less communication include for example EnOcean™, Dash7™, OneNet™, ANT™, Bluetooth™, Z-Wave™, Zigbee™, WirelessHart™, 6LoWPAN™, MiWi™, IEEE 802.15.4, IEEE 802.11 (WiFi), and others.

Usually, a protocol defines some unit of data that represents the minimum of information that is transmitted over a respective channel. Such units are as denoted "packet", "telegram", or "frame". In the context of the present disclosure, the term "frame" should denote such a unit of information as defined by the respective protocol under consideration. Further, it is common to provide a frame with addressing and/or routing information so that any entity that receives the frame is in principle able to determine whether the received frame is addressed to this entity.

Besides the implementation of the protocols, there is also a broad range of standard hardware for facilitating actual communication. For example, modules are available for carrying out communication over one or more protocols, so that there is no need for repeatedly implementing protocol and communication capabilities in a given application. Said modules usually feature some kind of inter-connectivity, so that cooperation with the application is facilitated. In other words, one may concentrate on the application as such by relying on standardized modules for effecting communication. Thus, there is no need for explicitly including the protocol and communication functionalities in the application as such.

Although the employment of standardized protocols and corresponding hardware—in the form of the aforementioned modules or as built-in functions of integrated circuits (ICs)—provides advantages with respect to simplicity, reliability, and cost, the use of standard "equipment", however, implies the respective limitations and restrictions from the chosen standard solution. As a consequence, a chosen protocol may, on the one hand, substantially facilitate implementation (low circuit complexity, high reliability, low unit cost, etc.), but, on the other hand, impose at the same time serious restrictions.

Amongst others, standard protocols may define a strict sequence with which data exchange needs to be carried out. For example, the IEEE 802.15.4 standard (and related implementations) provides a so-called request command frame for polling for pending data. In this way, a receiving entity (device) can be powered down or in an idle state, whilst a transmitting entity (device) generates or accumulates data to be transmitted to the receiving entity. This pending data can then be polled by the receiving entity by transmitting the request command frame to the transmitting entity. As a consequence, the receiving entity can decide on its own when to receive any pending date and, therefore, does not need to be "on line" all the time. On the contrary, the receiving device can save power when it decides that the reception of any pending data is not necessary at the moment.

At the same time, distributed data acquisition is becoming more and more popular in various environments, such as scientific research, industrial equipment, network management, facility management, and the like. With the advent of the so-called "internet of things", distributed stand-alone devices or applications get on-line, so as to gather local information, possibly process it, and forward or transmit the acquired data to some central entity for further processing and/or evaluation.

For example, a sensor device measures usage of a resource in a facility (e.g. water, electricity, soap, etc.). The acquired information may then be collected by some sort of equipment that communicates to the individual sensor device(s). It is desirable to have all such equipment operating reliable, manufactured at low cost, and consuming low power (e.g. the latter allows battery-powered stand-alone devices). Although the above objectives can be met by employing standard protocols and corresponding hardware, the chosen protocol may then limit the number of possible addressable devices, since the address space of the chosen protocol may not allow the definition of a sufficient number of unique address, and, with this, device identifiers.

There is therefore a need in various environments to allow an application implementation by means of standard equipment. At the same time, however, there is a need for further reducing the power consumption of the involved devices. Especially in view of distributed data acquisition equipment that is provided only with limited power resources and where maintenance (e.g. replacing or recharging batteries) is desirably reduced to a minimum. Specifically, there is a need for further improving standardized protocols and corresponding hardware with regard to power efficiency.

SUMMARY

According to an aspect, there is provided a method of transmitting a data frame from a source device to a target device, wherein the source device and the target device use a protocol defining a request command frame for polling for pending data. The method includes the steps of storing pending data to be transmitted to the source device in the target device, receiving a request command frame for polling the pending data from the source device, transmitting the pending data to the source device in response to receiving the request command frame, and extracting from the received request command frame allocated data to be transmitted from the source device to the target device.

According to another aspect, there is provided a method of transmitting a data frame from a source device to a target device, wherein the source device and the target device use a protocol defining a request command frame for polling for pending data. The method includes the steps of obtaining data to be transmitted to the target device in the source device, generating a request command frame for polling data pending for the source device at the target device, allocating the data to be transmitted in the request command frame, and transmitting the request command frame with the allocated data to be transmitted to the target device.

According to another aspect, there is provided a target device for receiving a data frame from a source device, wherein the source device and the target device use a protocol defining a request command frame for polling for pending data. The target device is configured to store pending data to be transmitted to the source device in the target device, to receive a request command frame for polling the pending data from the source device, to transmit the pending data to the source device in response to receiving the request command frame, and to extract from the received request command frame allocated data to be transmitted from the source device to the target device.

According to another aspect, there is provided a source device of transmitting a data frame from to a target device, wherein the source device and the target device use a protocol defining a request command frame for polling for pending data. The source device is configured to obtain data to be transmitted to the target device, to generate a request command frame for polling data pending for the source device at the target device, to allocate the data to be transmitted in the request command frame, and to transmit the request command frame with the allocated data to be transmitted to the target device.

According to another aspect, there is provided a system for distributed data acquisition including at least one source device of any one of the disclosed embodiments and at least one target device of any one of the disclosed embodiments.

BRIEF DESCRIPTION OF THE DRAWINGS

Embodiments of the present invention, which are presented for better understanding the inventive concepts and which are not to be seen as limiting the invention, will now be described with reference to the Figures in which.

DETAILED DESCRIPTION OF PARTICULAR EMBODIMENTS

Figure 1A:
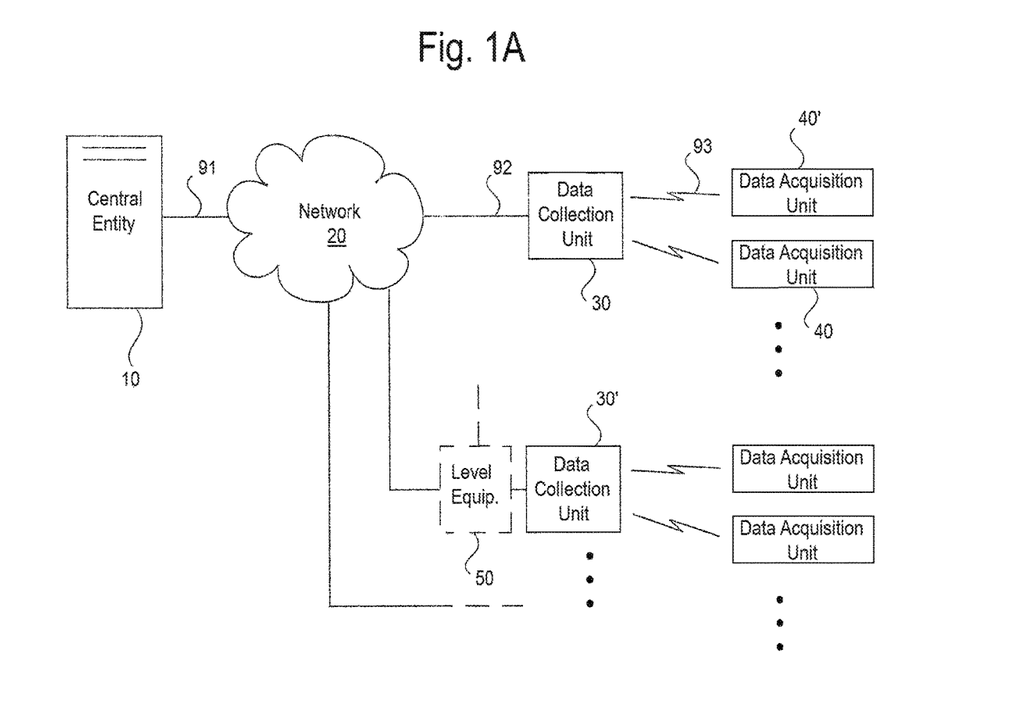
FIG. 1A shows a schematic view of a data acquisition system including a central entity, data collection equipment, and data acquisition equipment, implementing data frame transmission according to an embodiment of the present invention.

FIG. 1A shows a schematic view of a data acquisition system including a central entity, data collection equipment, and data acquisition equipment, implementing data frame transmission according to an embodiment of the present invention. More specifically, the data acquisition system of FIG. 1A includes a central entity 10, data collection equipment in the form of one or more data collection units 30, 30', and data acquisition equipment in the form of one or more data acquisition units 40, 40'. The central entity 10 can exchange data with the data collection units 30, 30' by use of some kind of network or network system 20, possibly including the internet, one or more corporate networks, and/or public networks, such as telephone or mobile communication networks.

As an example, a first link 91 couples the central entity 10 to the internet 20, and a second link 92 couples the at least one data collection unit 30 to internet 20. As further examples, link 92 between the data collection unit 30 and network 20 can be a direct or a quasi-direct internet connection via, for example, a DSL or LAN line. Further, also wireless data transmission can be employed, so that the data collection equipment 30, 30' communicates via an air interface (GSM, UMTS, WLAN, WiFi, WiMaX, and the like) to a mobile communications network or respective access point, and with this to network 20.

Optionally, one or more data collection unit(s) 30' of the data collection equipment may be coupled by one or more intermediate data collection level(s) to the network 20. One way is to implement optional level equipment 50 between the data collection units and the network 20. Such optional level equipment (units) may in turn collect, process, and/or forward data from one or more data collection units 30' to, from, or between network 20. For example, optional level equipment 50 can be provided on a building-, section-, department-, or story-level. In this way, corresponding level equipment 50 collects, processes, and/or forwards data from and to data collection equipment 30' that is, respectively, arranged in one section, one building, one department, or on one story.

The data acquisition equipment is in the form of at least one data acquisition unit 40 arranged at a corresponding location for acquiring data (gathering information). This data can be acquired by use of one or more sensors that are configured to convert some physical figure into a numerical value that is suitable for transmission on a communication network. Said physical figures may include any measurable quantity, such as temperature, illumination, time and date, air pressure, humidity, current, voltage, resistance, and the like. More specifically, the measured figure may reflect some device state, such as a consumption figure, filling level, expiry date, and the like. For example, a light-barrier may employ a light source and a light sensor that measures illumination intensity for determining a filling level of a dispenser or waste bin. Other suitable concepts that can be sensed via a physical figure include infrared detection, ultraviolet detection, Radio frequency (RF) detection, ultrasonic detection, etc.

According to the present embodiment, one individual data acquisition unit 40 communicates with at least one data collection unit 30 over a wireless link 93, such as a radio or infrared link, which, in turn, may follow one or more applicable and aforementioned standards and protocols. As a specific example, wireless link 93 may be implemented with the IEEE 802.15.4 standard (or a related implementation) that provides a request command frame for polling for pending data, or in a way that a structure of the used frames is compatible with the IEEE 802.15.4 standard or a related implementation.

Figure 1B:
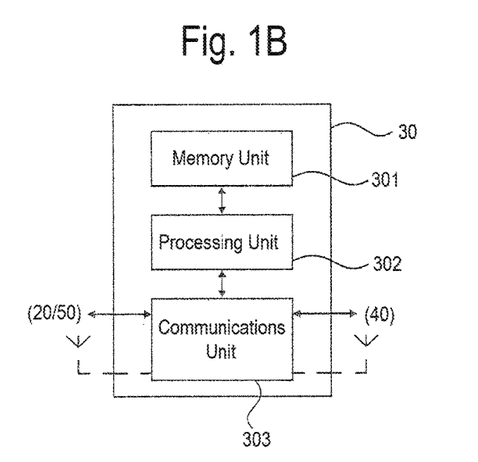
FIG. 1B shows a schematic view of an exemplary data collection unit implementing data frame transmission according to another embodiment of the present invention.
Figure 1C:
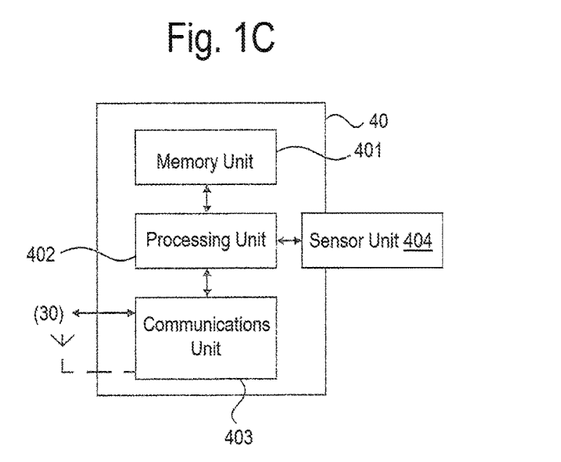
FIG. 1C shows a schematic view of an exemplary data acquisition unit implementing data frame transmission according to another embodiment of the present invention.

The specific ways of data frame transmission in the present embodiment are described in greater detail in conjunction with FIGS. 1B and 1C. Specifically, FIG. 1A shows a schematic view of an exemplary data collection unit 30 as one possible implementation of a target device using data frame transmission, and FIG. 1C shows a schematic view of an exemplary data acquisition unit 40 as one possible implementation of a source device using data frame transmission.

The exemplary data collection unit 30 shown in FIG. 1B includes a processing unit 302, a memory unit 301, and a communication unit 303. The memory unit 301 may store computer instruction code that can be executed on the processing unit 302 so as to implement the functionalities and method embodiments of the present invention. The communication unit 303 includes a wireless communication device that facilitates data exchange and communication toward one or more associated data acquisition units 40, 40' via respective links 93. It is to be noted that links 93 may be allocated on separate channels or all on one shared channel in the sense that more than one data acquisition unit 40 receive a frame, albeit this frame being addressed only to one specific data acquisition unit (e.g. data acquisition unit 40'). As far as link 92 is concerned, data communication toward network 20 may for example be effected via a wireless link to level equipment 50, which, in turn has a DSL or LAN connection toward the internet 20.

The memory unit 301 stores computer instruction code that can be executed on the processing unit 302 so as to implement a method of transmitting a data frame from a data acquisition unit 40 as a source device to the data collection unit 30 as a target device, wherein the units use a protocol defining a request command frame for polling for pending data, e.g. the IEEE 802.15.4 standard or a related implementation, or a frame structure compatible thereto. More specifically, the memory unit 301 stores code for implementing a storing of pending data to be transmitted to the data acquisition unit 40. By means of storing this pending data, the data acquisition unit 40 does not need to be "on line" all the time and can decide for itself when pending data is to be received (e.g. when the unit 40 needs to power up anyway for other reasons). Further, the stored code implements a receiving of a request command frame for polling the pending data from the data acquisition unit 40, and, in response to receiving the request command frame, a transmitting of the pending data to the data acquisition unit 40.

According to particular embodiments, the code also implements extracting from the received request command frame allocated data to be transmitted from the data acquisition unit 40 to the data collection unit 30. In this way, not only the pending data is polled by the data acquisition unit 40, but—at the same time—allocated data to be destined for the data collection unit is transmitted in one frame. Therefore, the data acquisition unit can save more power, since it can wait until allocated data, such as acquired sensor measurement data, needs to be transmitted to the data collection unit 30, and, with this, poll any pending data at the same time.

The exemplary data acquisition unit 40 shown in FIG. 1C includes a processing unit 402, a memory unit 401, and a communication unit 403. The memory unit 401 may store computer instruction code that can be executed on the processing unit 402 so as to implement the functionalities and method embodiments of the present invention. The communication unit 403 may optionally include one wireless communication devices that facilitates data exchange and communication toward an associated data collection unit 30. Again, communication toward an associated data acquisition unit may be implemented as is described in conjunction with link 93.

As a data acquisition unit it further comprises a sensor unit 404 that is configured to acquire the desired data, by, for example, measuring one or more figures of interest. The sensor unit 404 may for this purpose employ sensor devices, current/voltage sources, light sources, thresholding circuits, analog-to-digital converters, averaging circuits, filter circuits, and the like. More specifically, the memory unit 401 stores computer instruction code that can be executed on the processing unit 402 so as to receive data (a frame) from the associated data collection unit and to transmit data to the associated data collection unit.

For example, a frame from the associated data collection unit (downlink) may include configuration data and/or instructions setting any one of an acquisition interval, an acquisition precision, a figure selection (i.e. what figure(s) are to be acquired), setting the unit into a power-on, power-off, or idle state, setting the transmission interval, and the like. On the uplink, the data acquisition unit may report the acquired data and/or status information (e.g. operation state, possible fault(s), remaining battery/power resources, etc.) back to the associated data collection unit.

The memory unit 401 stores computer instruction code that can be executed on the processing unit 402 so as to implement an embodiment of the present invention, namely a data frame transmission from the data acquisition unit 40 as a source device to the data collection unit 30 as a target device, wherein the units again use a protocol defining a request command frame for polling for pending data, e.g. the IEEE 802.15.4 standard or a related implementation, or a frame structure compatible thereto. More specifically, the memory unit 401 stores code for implementing a obtaining of data to be transmitted to the data collection unit 30, which can be anything of acquired sensor measurement data, status data, still-alive messages, and the like. The code also implements a generating of a request command frame for polling data pending for the data acquisition unit 40 at the data collection device 40, in the sense that the latter device 40 can store (buffer) any data to be transmitted to the data acquisition unit 40.

According to particular embodiments, the code also implements an allocating of the data to be transmitted in the request command frame and a transmitting of the request command frame with the allocated data to be transmitted to the data collection device 40. In this way, the data acquisition unit 40 can decide for itself when pending data is polled from the data collection device 30. For example, the data acquisition unit 40 can wait until a report of measured sensor data is due (e.g. given by a time interval or triggered by an event) with the consequence that the data acquisition unit 40 needs to power up in some way to effect the transmission of the data. At this instance, the data acquisition unit can combine reporting data with polling for pending data by allocating data into the request command frame.

As a result, not only the data acquisition unit 40 but also the data collection unit 30 can save more power, since two tasks are accomplished with one frame. It is to be noted that generally the allocation of data into the request command frame and transmitting such a frame is still more power effective than transmitting two separate dedicated frames due to the format and addressing overhead of each frame. Further, besides the more efficient use of the available power resources, also radio resources are used more efficiently. Instead of two or more frames, only one frame facilitates two purposes. In this way, interference and emissions are further reduced.

It should be further noted that full bidirectional data exchange becomes possible between the central entity 10 on the one hand and one individual data acquisition 40, 40' on the other. Specifically, the central entity 10 can transmit data over link 91, network 20, link 92, the associated data collection unit 30, and link 93 to the particular data acquisition unit 40'. Likewise, the individual data acquisition unit 40' can transmit data back to the central entity 10 over link 93, the associated data collection unit 30, link 92, network 20, and link 91. As an example, data in the downlink, i.e. in a direction from the central entity 10 to a data acquisition unit, may include configuration data, whereas data in the uplink, i.e. in the direction from one data acquisition unit to the central entity 10, may include sensor data representing locally acquired data in a format suitable for transmission and further processing.

Figure 2:
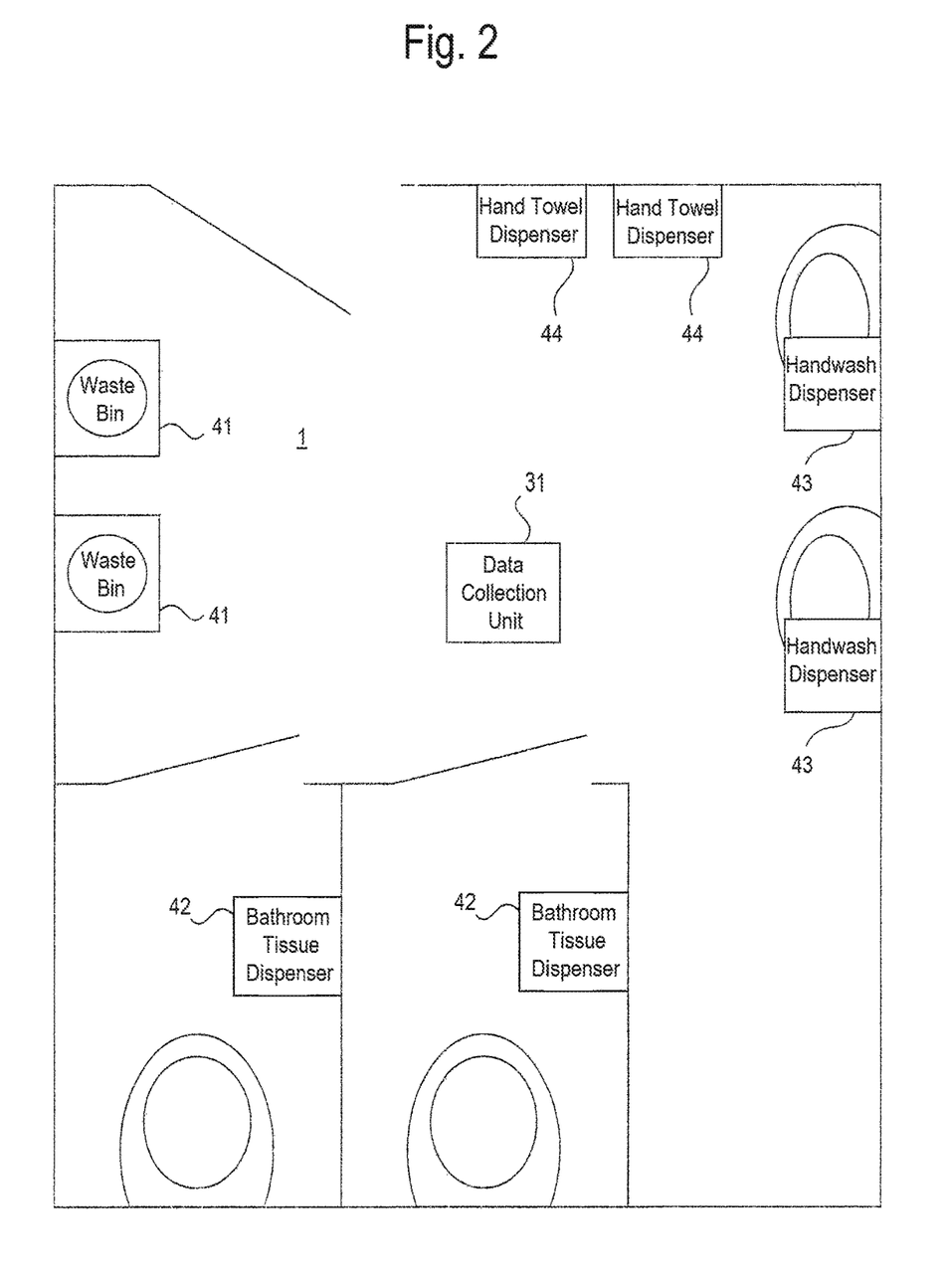
FIG. 2 shows a possible implementation of data frame transmission in data collection equipment and data acquisition equipment arranged in a facility according to another embodiment of the present invention.

FIG. 2 shows a possible implementation of data frame transmission in data collection equipment and data acquisition equipment arranged in a facility according to another embodiment—more specifically, as a managed facility in the form of a restroom 1. Restroom 1 has several locations from which consumables may be dispensed, including waste bins 41, bathroom tissue dispensers 42, handwash dispensers 43, and hand towel dispensers 44. During usage of the restroom, handwash dispensers 43, hand towel dispensers 44, and bathroom tissue dispensers 42 may become depleted, while waste bins 41 may become filled.

In conventional facilities management approaches, a maintenance worker or team would periodically check restroom 1, including checking the levels in the dispensers 43, the quantity of hand towels in hand towel dispensers 44, the quantity of bathroom tissue in bathroom tissue dispensers 42, and the levels of waste in each of waste bins 41. The maintenance worker may make a judgement as to whether any of the resources are likely to need replenishment in the period before his next scheduled maintenance visit, and he may replenish those resources which are deemed to require such replenishment, provided that the worker has sufficient consumables on the maintenance cart. The maintenance worker may also empty bins 41, provided that the worker has sufficient remaining capacity for waste on the maintenance cart. If either the capacity for waste or the remaining resources on the cart are insufficient, the worker may either not replenish the resources or may adjust his route to visit a central storage location to resupply the cart before continuing.

Restroom 1 of FIG. 2 also includes a data collection unit 31, for example a unit that is described as unit 30, 30' in conjunction with other embodiments. The data collection unit 31 has associated data acquisition units in each of the dispensers/bins 41-44. Specifically, these data acquisition units measure—respectively—towel-, tissue-, and soap consumption, and filling level of bins 41, so as report this acquired data back via data collection unit 31 to a central entity for facility management. This data is transmitted on an uplink toward said central entity.

More generally, however, embodiments of the present invention may also apply to any type of facility management, where use of consumables and supply thereof need to be management on a large scale. For example, large organizations such as companies, authorities, etc. provide communal facilities for the use of e.g. employees, visitors, and other personnel. In the context of a commercial establishment, such facilities may not include only restrooms like the one shown in conjunction with FIG. 2, but also conference rooms, document preparation stations, food preparation stations, maintenance stations, local supply storage, and other similar facilities.

Each facility may be associated with storage locations or dispensing locations where consumable items to be used in and around the facility may be stored ready for use, and where discarded consumables may be deposited for disposal. In the case of washrooms, such storage locations may comprise lavatory paper dispensers, handwash or antibacterial gel dispensers, refuse bins, and hygiene product dispensers. Where the facility is a document preparation center, a storage location may include paper storage locations, cartridge storage locations, stationery item storage locations, and the like. Where the facility is a maintenance area, storage locations may include storage locations for different parts, and for maintenance and cleaning compounds, as well as, for example, handwash dispensers and paper towel dispensers. Such locations generally provide a resource to users of the facility. Especially, the resource may be a consumable, or may be space for depositing used consumables and/or refuse. In each case, the resource may be depleted by users of the facility.

Such management may present a significant organizational and logistical challenge, and relies heavily on the experience of both managers and workers. Such challenges include ensuring that each facility is visited sufficiently regularly to assess the resourcing requirements of each location in the facility, and to replenish and/or empty the locations as appropriate. Further challenges include ensuring that facilities are maintained in adequate condition without needing to provide very large areas for the storage of waste or to maintain a large stock of consumables in the facilities themselves, on the supply carts, or at a central location. Finally a significant challenge is to manage the facilities in such a way so as to respond to unusual events which result in the sudden depletion of one or more resources or a sudden accumulation of waste.

For such applications the present embodiments may provide an advantageous solution, since distributed data acquisition equipment can be provided in a generally efficient fashion. Specifically, embodiments of the present invention allow for the provision of cost-efficient and reliable equipment (data collection and acquisition equipment) and interoperability due to the use of standardized communication solutions, and—at the same time—allows for a more efficient use of power resources available at the involved devices. Additionally, also interference and radio frequency emissions are further reduced by a reduction of the number of frames exchanged of the air interface during regular operation.

Figure 3A:
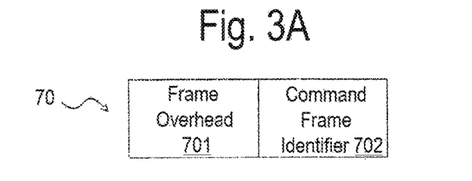
FIG. 3A shows a schematic view of a conventional request command frame.

FIG. 3A shows a schematic view of a conventional request command frame. Specifically, a request command frame 70 includes a frame overhead 701 and a command frame identifier 702. The command frame identifier 702 may store a value that characterizes frame 70 as a request command frame. In this way, any receiving entity is able to identify frame 70 as a request command frame so as to initiate all actions and processing required by the respective standard.

In the example of the IEEE 802.15.4 standard (and related implementations or frame structures compatible thereto), frame overhead 701 may include a variable number of octets (bytes) including so-called MHR fields such as a frame control field, a sequence number filed, addressing fields, and the like. Further, the command frame identifier 702 may specify a specific value such as the hexadecimal value 0x04 that is one way of identifying frame 70 as a request command frame.

Figure 3B:
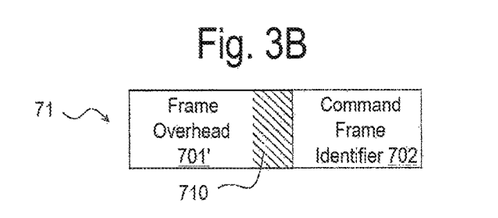
FIG. 3B shows a schematic view of a request command frame according to another embodiment of the present invention.

FIG. 3B shows a schematic view of a request command frame according to another embodiment. The request command frame 71—similarly to frame 70 as described in conjunction with FIG. 3A—includes a frame overhead 701' and a command frame identifier 702. According to this embodiment, the request command frame overhead 701' is modified so as to include also allocated data 710. This may be effected by employing unused data in the frame overhead or by expanding the size of the overhead 701' with respect to overhead 701 of frame 70. One possibility would be to use unused addressing fields of the MHR fields or to add any data to fields that have a variable length. For example, the allocated data may be appended in the form as additional addressing fields, since the addressing fields as such may be of variable octet (byte) length.

Figure 3C:
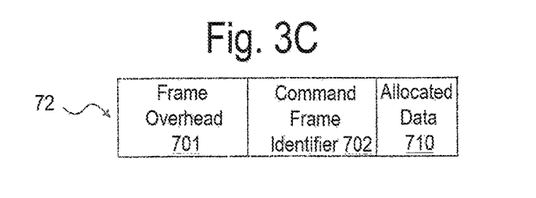
FIG. 3C shows a schematic view of a request command frame according to another embodiment of the present invention.

FIG. 3C shows a schematic view of a request command frame according to another embodiment. Request command frame 72 again includes a frame overhead 701 and a command frame identifier 702. In line with this embodiment, the allocated data is added to the frame—for example—at the end of the command frame identifier 702. In this way, the allocated data may be of variable, virtually unlimited, length, since data 710 follows the standard configuration of overhead 701 and command frame identifier 702. In this way, any employed equipment needs only to be configured to check whether allocated data 710 is included in request command frame 72 by simply listening (receiving) any further data after the command frame identifier 702 has been received. As a consequence, modifications to existing equipment and implementations can remain very little. However, at the same time, advantages of the disclosed embodiments can still be attained.

Figure 4:
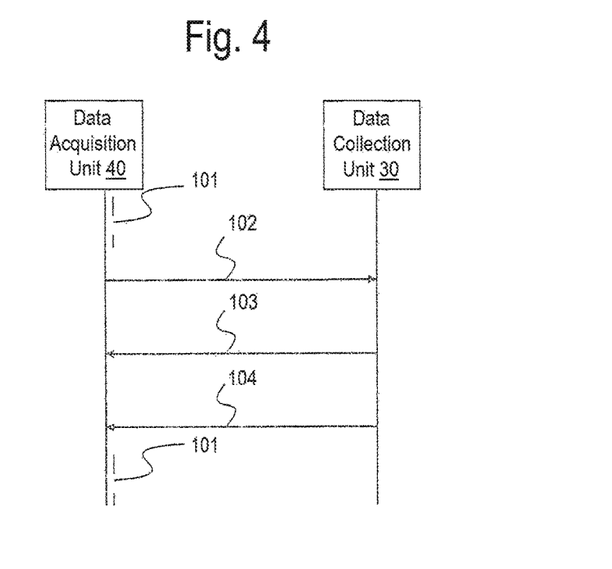
FIG. 4 shows a schematic view of a frame sequence between a source device and a target device according to another embodiment of the present invention.

FIG. 4 shows a schematic view of a frame sequence between a source device and a target device according to another embodiment. In this embodiment, the source device is a data acquisition unit 40 as disclosed and described in conjunction with other present embodiments and the target device is a data collection unit 30 as also disclosed in conjunction with other present embodiments. During a silent period 101, the data acquisition unit 40 is in a power-save or idle mode, or focuses its resources to acquiring and collecting sensor data or detecting any events. During said silent period 101, any equipment for performing radio communication (e.g. via link 93 as disclosed in conjunction with FIG. 1A) can be powered down or set into a power-save mode, since no communication, data and frame exchange should occur.

At some point in time, data acquisition unit 40 decides to report data back to the data collection unit 30, and, at the same time, request any pending data. For this purpose, data acquisition unit 40 generates a request command frame and allocates in this frame any data to be transmitted to the data collection unit 30. This so-generated request command frame is transmitted in 102 to the data collection unit 30. Data collection unit 30, in turn, receives the request command frame and determines whether any data is pending for data acquisition unit 40. Accordingly, data collection unit 30 transmits in 103 an acknowledgement message which includes, if there is pending data for data acquisition unit 40, some kind of notification, e.g. in the form of setting a frame pending flag. If indeed data is pending, this data is transmitted in 104 from the data collection unit 30 to the data acquisition unit 40. Since data acquisition unit 40 has accomplished all necessary tasks, i.e. reporting data to the data collection unit 30 and, at the same time, receiving any pending data, the unit 40 may return to the silent state 101.

Figure 5A:
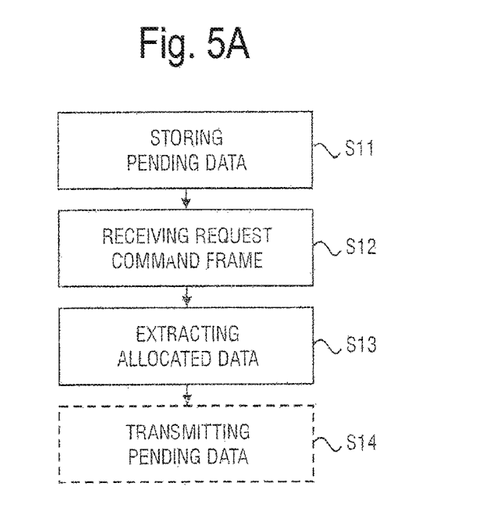
FIGS. 5A and 5B show flowcharts of method embodiments of the present invention.

FIG. 5A shows a flowchart of a method embodiment of the present invention. This method embodiment is intended to implement a transmitting of a data frame from a source device to a target device, wherein the source device and the target device use a protocol defining a request command frame for polling for pending data (as in IEEE 802.15.4 and related implementations or a frame structure compatible thereto). The present method embodiment involves a step S11 of storing pending data to be transmitted to the source device in the target device. This data can be for example configuration data obtained from some central entity to be forwarded to the source device so as to configure its operation and behavior (acquisition interval, acquisition precision, power-save mode, request for reporting level of remaining power resources, and the like).

In step S12 a request command frame for polling the pending data is received from the source device. If there is indeed pending data, this pending data is transmitted in step S14 to the source device in response to receiving the request command frame. If no data is pending, a simple acknowledgement message can be however transmitted with some indicator for notifying the source device that no data is pending and that the source device can return accordingly to some kind of power-save or idle mode. In step S13, any allocated data to be transmitted from the source device to the target device is extracted from the received request command frame. Note that the shown order of steps S13 and S14 can be arranged in any suitable way, e.g. also so that (optional) step S14 is performed prior to step S13.

Figure 5B:
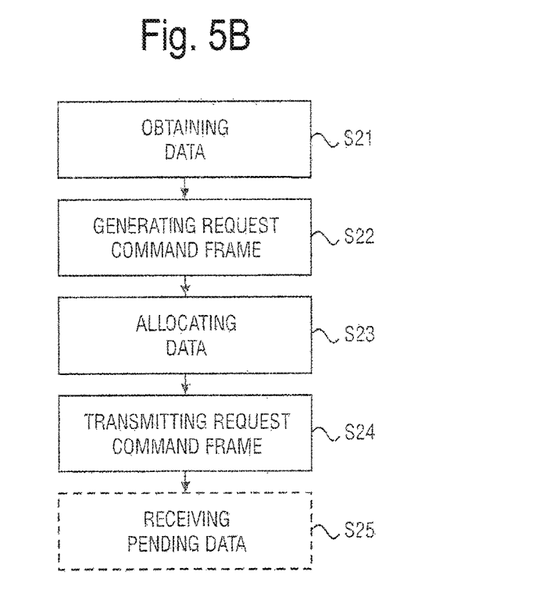

FIG. 5B shows a flowchart of a method embodiment of the present invention. This method embodiment is intended to transmitting a data frame from a source device to a target device, wherein the source device and the target device use a protocol defining a request command frame for polling for pending data (as in IEEE 802.15.4 and related implementations or a frame structure compatible thereto). The present method embodiment involves a step S21 of obtaining data to be transmitted to the target device in the source device. For example, this can involve acquiring, processing, or storing of sensor measurement data to be reported to a data collection unit and further to some kind of central entity.

In step S22 a request command frame is generated for polling data pending for the source device at the target device. Step S22 and subsequent steps can be initiated in response to determining that the obtained data in step S21 needs to be transmitted when, for example, some acquisition/reporting interval has expired and/or an event regarding the acquired measurement data occurs, such as a measured value meeting some condition with respect to a predetermined threshold. In step S23 the data to be transmitted is allocated in the request command frame, and in step S24, the so-generated request command frame with the allocated data to be transmitted is transmitted to the target device. If there is indeed pending data, this data can be received in an optional step S25.

Although detailed embodiments have been described, these only serve to provide a better understanding of the invention defined by the claims, and are not to be seen as limiting.

The invention claimed is:

1. A method of receiving a data frame from a data acquisition device, wherein the data acquisition device and a data collection device use a protocol defining a request command frame for polling for pending data, the method comprising the steps of:
storing pending data to be transmitted to the data acquisition device in the data collection device;
receiving, from the data acquisition device, a single request command frame including a frame overhead and a command frame identifier, the received single request command frame for polling the pending data stored in the data collection device, the frame overhead including a plurality of fields for the defined protocol and the command frame identifier identifying the received single request command frame;
transmitting the pending data to the data acquisition device in response to receiving the single request command frame; and
extracting, from the received single request command frame, allocated data acquired by the data acquisition device for transmission to the data collection device, wherein the allocated data is extracted from at least one additional addressing field of the plurality of fields of the frame overhead of the received single request command frame.

2. The method of claim 1, further comprising a step of:
one or both of processing and forwarding to a central entity the extracted allocated data.

3. A method of receiving a data frame from a data acquisition device, wherein the data acquisition device and a data collection device use a protocol defining a request command frame for polling for pending data, the method comprising the steps of:
storing pending data to be transmitted to the data acquisition device in the data collection device;
receiving, from the data acquisition device, a single request command frame including a frame overhead and a command frame identifier, the received single request command frame for polling the pending data stored in the data collection device, the frame overhead including a plurality of fields for the defined protocol and the command frame identifier identifying the received single request command frame;
transmitting the pending data to the data acquisition device in response to receiving the single request command frame;
determining whether allocated data follows the received single request command frame after the command frame identifier; and
extracting, from the received single request command frame when the allocated data is determined to follow the received single request command frame after the command frame identifier, the allocated data acquired by the data acquisition device for transmission to the data collection device, wherein the allocated data is extracted from the received single request command frame after the frame overhead and the command frame identifier of the received single request command frame.

4. A method of transmitting a data frame from a data acquisition device to a data collection device, wherein the data acquisition device and the data collection device use a protocol defining a request command frame for polling for pending data, the method comprising the steps of:
obtaining data, from one or more sensor units, the obtained data to be transmitted to the data collection device, and the obtained data stored in the data acquisition device;
generating a single request command frame for polling pending data for the data acquisition device, the pending data stored at the data collection device, the single request command frame including a frame overhead and a command frame identifier, the frame overhead including a plurality of fields for the defined protocol and the command frame identifier identifying the received single request command frame;
allocating the obtained data in the single request command frame; and
transmitting the single request command frame including the allocated data to the data collection device, wherein the allocated data is allocated in at least one field of the plurality of fields of the frame overhead of the generated single request command frame.

5. The method of claim 4, further comprising a step of:
waiting to receive the pending data in response to transmitting the single request command frame.

6. The method of claim 5, further comprising a step of:
setting the data acquisition device into a power-save mode after determining that no pending data needs to be received from the data collection device or the pending data was received from the data collection device.

7. The method of claim 4, wherein the step of generating the single request command frame is triggered by an interval or timer expiry.

8. The method of claim 4, wherein the step of generating the single request command frame is triggered by the occurrence of an event.

9. The method of claim 4, wherein a structure of the single request command frame is compatible with the IEEE 802.15.4 standard or a related implementation.

10. A method of transmitting a data frame from a data acquisition device to a data collection device, wherein the data acquisition device and the data collection device use a protocol defining a request command frame for polling for pending data, the method comprising the steps of:
obtaining data, from one or more sensor units, the obtained data to be transmitted to the data collection device, and the obtained data stored in the data acquisition device;
generating a single request command frame for polling pending data for the data acquisition device, the pending data stored at the data collection device, the single request command frame including a frame overhead and a command frame identifier, the frame overhead including a plurality of fields for the defined protocol and the command frame identifier identifying the received single request command frame;
allocating the obtained data in the single request command frame; and
transmitting the single request command frame including the allocated data to the data collection device, wherein the allocated data is appended after the frame overhead and the command frame identifier of the generated single request command frame.

11. A data collection device for receiving a data frame from a data acquisition device, wherein the data acquisition device and the data collection device use a protocol defining a request command frame for polling for pending data, the data collection device being configured to:
- store pending data to be transmitted to the data acquisition device in the data collection device;
- receive, from the data acquisition device, a single request command frame including a frame overhead and a command frame identifier, the received single request command frame for polling the pending data stored in the data collection device, the frame overhead including a plurality of fields for the defined protocol and the command frame identifier identifying the received single request command frame;
- transmit the pending data to the data acquisition device in response to receiving the single request command frame; and
- extract, from the received single request command frame, allocated data acquired by the data acquisition device for transmission to the data collection device, wherein the allocated data is extracted from at least one additional addressing field of the plurality of fields of the frame overhead of the received single request command frame.

12. The data collection device of claim 11, further being configured as part of distributed data acquisition equipment, and being configured to transmit a frame to the data acquisition unit.

13. A data collection device for receiving a data frame from a data acquisition device, wherein the data acquisition device and the data collection device use a protocol defining a request command frame for polling for pending data, the data collection device being configured to:
- store pending data to be transmitted to the data acquisition device in the data collection device;
- receive, from the data acquisition device, a single request command frame including a frame overhead and a command frame identifier, the received single request command frame for polling the pending data stored in the data collection device, the frame overhead including a plurality of fields for the defined protocol and the command frame identifier identifying the received single request command frame;
- transmit the pending data to the data acquisition device in response to receiving the single request command frame;
- determining whether allocated data follows the received single request command frame after the command frame identifier; and
- extract, from the received single request command frame when the allocated data is determined to follow the received single request command frame after the command frame identifier, the allocated data acquired by the data acquisition device for transmission to the data collection device, wherein the allocated data is extracted from the received single request command frame after the frame overhead and the command frame identifier of the received single request command frame.

14. A data acquisition device of transmitting a data frame to a data collection device, wherein the data acquisition device and the data collection device use a protocol defining a request command frame for polling for pending data, the data acquisition device being configured to:
- obtain data, from one or more sensor units, the obtained data to be transmitted to the data collection device, and the obtained data stored in the data acquisition device;
- generate a single request command frame for polling pending data for the data acquisition device, the pending data stored at the data collection device, the single request command frame including a frame overhead and a command frame identifier, the frame overhead including a plurality of fields for the defined protocol and the command frame identifier identifying the received single request command frame;
- allocate the obtained data in the single request command frame; and
- transmit the single request command frame including the allocated data to the data collection device, wherein the allocated data is allocated in at least one field of the plurality of fields of the frame overhead of the generated single request command frame.

15. The data acquisition device of claim 14, further comprising:
- a processing unit; and
- a memory unit, wherein the memory unit stores code configured for the processing unit to implement the functionalities of the data acquisition device.

16. The data acquisition device of claim 14, further comprising:
- a communication unit for establishing communication over a shared channel.

17. The data acquisition device of claim 14, further comprising:
- an internal power source.

18. The data acquisition device of claim 14, further being configured as part of distributed data acquisition equipment, comprising the one or more sensor units for acquiring data and being configured to receive a frame from the data collection unit.

19. A data acquisition device of transmitting a data frame to a data collection device, wherein the data acquisition device and the data collection device use a protocol defining a request command frame for polling for pending data, the data acquisition device being configured to:
- obtain data, from one or more sensor units, the obtained data to be transmitted to the data collection device, and the obtained data stored in the data acquisition device;
- generate a single request command frame for polling pending data for the data acquisition device, the pending data stored at the data collection device, the single request command frame including a frame overhead and a command frame identifier, the frame overhead including a plurality of fields for the defined protocol and the command frame identifier identifying the received single request command frame;
- allocate the obtained data in the single request command frame; and
- transmit the single request command frame including the allocated data to the data collection device, wherein the allocated data is appended after the frame overhead and the command frame identifier of the generated single request command frame.

* * * * *